United States Patent

[11] 3,607,064

| [72] | Inventors | Robert E. Dollinger;<br>Glenn J. Forseth, both of Borger, Tex. |
|---|---|---|
| [21] | Appl. No. | 795,679 |
| [22] | Filed | Jan. 31, 1969 |
| [45] | Patented | Sept. 21, 1971 |
| [73] | Assignee | Phillips Petroleum Company |

[54] CARBON BLACK PRODUCTION
8 Claims, No Drawings

| [52] | U.S. Cl. | 23/209.4, 23/209.6, 106/307 |
|---|---|---|
| [51] | Int. Cl. | C09c 1/50 |
| [50] | Field of Search | 23/209.4, 209.5, 209.6; 106/307 |

[56] References Cited
UNITED STATES PATENTS

| 2,914,418 | 11/1959 | Eastman | 106/307 |
|---|---|---|---|
| 3,010,794 | 11/1961 | Friauf et al. | 23/209.4 |
| 3,010,795 | 11/1961 | Friauf et al. | 23/209.4 |
| 3,306,762 | 2/1967 | Ruble | 106/307 |
| 3,383,175 | 5/1968 | Jordan et al. | 23/209.4 |
| 3,494,740 | 2/1970 | Speck | 23/209.4 |

*Primary Examiner*—Edward J. Meros
*Attorney*—Young and Quigg

ABSTRACT: A method of controlling the property of a furnace produced carbon black by introducing with the preheated make-oil a property-affecting mixture having a melting point less than that temperature to which the make-oil is preheated.

CARBON BLACK PRODUCTION

This invention relates to the control of carbon black properties.

In one of its more specific aspects, this invention relates to a method of adding property-controlling additives to the reaction zone in carbon black production.

Various materials are conventionally added to the reaction zone of the furnace process for the production of carbon black. These materials are added to adjust and control the property of the carbon black. Addition of such extraneous materials is most frequently made to affect the structure, or dibutyl phthalate number of the product black. Most frequently these structure-affecting materials comprise amounts of an alkali metal having an atomic number of at least 19, and are employed in the form of their compounds. Among the most effective additives are sodium nitrate and nitrite and potassium nitrate and nitrite and combinations thereof, in the solid or liquid state, and dissolved or suspended in any of the reactants introduced into the reaction zone.

The preferred additives are the nitrates and nitrites of potassium. These compounds have melting points of about 635° F. and 825° F., respectively, and are generally introduced into the reaction zone in the form of aqueous solutions.

As a matter of convenience, it is customary to prepare an aqueous solution of the additive and to add it to the make-oil wherein the additive is retained. The make-oil containing the additives is generally preheated to about 275° F. to about 600° F. prior to its introduction into the reactor.

Several complications arise in introducing additives into the furnace in such a manner. Due to the nature of the equipment, introduction of the additives directly into the reaction zone is frequently impractical. If the additive is added directly in the form of an aqueous solution, preheating the make-oil evaporates the aqueous solvent at the oil nozzle obstructing it with additive buildup. If the additive is added at a temperature sufficient to maintain it in the melted state, the high temperature required results in coking of the make-oil and obstruction of the nozzle. If the additive is introduced as an aqueous solution in the make-oil and the preheat temperature of the make-oil is held at a low value to prevent vaporization of the aqueous solvent, other adjustments must be made to the process to compensate for the lack of preheat in the make-oil.

The method of this invention alleviates these difficulties. According to the method of this invention, the property of the carbon black is regulated by introducing into the reaction zone a mixture of at least two components, the mixture being carbon black structure-affecting, the mixture having a melting point lower than the melting point of the structure-affecting additive contained therein.

The amount of the mixture which will be introduced will be such as to supply to the reaction zone that amount of the property-affecting additive which is customarily added individually to the reaction zone, this amount being from about 10 to about 1,000 parts by weight per million parts by weight of carbon black produced.

Accordingly, it is an object of this invention to provide a method of adding carbon black property-affecting additives to a carbon black reaction zone in a manner which avoids plugging of the make-oil nozzle.

It is also an object of this invention to provide a method of increasing the quantity of structure-affecting additives which can be introduced into the reaction zone of a carbon black reactor while maintaining conventional make-oil addition conditions.

The method of this invention contemplates any combination of materials, at least one of which affects a property, generally structure, of the carbon black, the combination of which has a melting point lower than that of the property-affecting additive, itself. The reduced melting point permits injection of the additive into the furnace in the form of a fluid, under the conditions of temperature at which the make-oil is introduced.

For example, a material having no effect upon the quality of nitrate, the material serving only to form with the potassium nitrate a mixture which has a lower melting point than either that of the material, itself, or of the potassium nitrate; similarly, the melting point, or fluidity point, will be less than that temperature to which the make-oil, in which the mixture is incorporated, is preheated under conventional operations. The mixture can also be comprised of two or more materials, either of which affect the structure of the carbon black; or the mixture can be composed of two or more materials, none of which affects the properties of the carbon black but the components forming a mixture which does affect the property of the black.

As previously mentioned, the most frequently employed structure-affecting additives are the nitrates and nitrite compounds of potassium and sodium. These compounds, and mixtures of these compounds, have the following melting points and have been found satisfactory for use according to the method of this invention.

| Compound: | Percent compound by weight | | | | | | | | | |
|---|---|---|---|---|---|---|---|---|---|---|
| $NaNO_2$ | 100 | | | | 45 | 40 | 40 | 10 | 60 | 34 |
| $NaNO_3$ | | 100 | | | 50 | | 10 | | 30 | 20 | |
| $KNO_2$ | | | 100 | | | | | 10 | | | 16 |
| $KNO_3$ | | | | 100 | 50 | 55 | 50 | 50 | 60 | 20 | 50 |
| Melting point, °F | 530 | 585 | 825 | 635 | 425 | 285 | 300 | 290 | 400 | 320 | 320 |

As mentioned, it is preferable that one of the components of the mixture be significant in its modification of the properties of carbon black, the other compound being less effective or substantially noneffective in this respect. Such a mixture would, for example, be one comprised of stannous chloride, having a melting point of about 475° F. and potassium nitrate, having a melting point of about 635° F., the resulting mixture having a melting point less than 475° F. and being an effective property controlling additive.

This invention also contemplates the use of mixtures of materials, neither of which affects the property of the black, the combination of which, however, does affect some property of the carbon black. Hence, a wide variety of materials is included within the scope of this invention.

While the above data serves only to show various percentages of various compounds, it will suggest other mixtures which are suitable property-affecting additives, the combination of which has a sufficiently low melting point to allow its inclusion as a fluid material under the conventional preheat temperature of the liquid reactants.

EXAMPLE I

Two runs were made in an identical furnace black reactor under substantially identical conditions. In respect to the pertinent conditions, data were as follows:

| Run Number | 1 | 2 |
|---|---|---|
| Oil preheat temperature, °F | 595 | 595 |
| Additive added, p.p.m | 410 K+a | 390 K+ 270 Na+b |
| Structure, DBP, cc./100 gm | 56 | 57 |
| Make-oil nozzle condition | Plugged | Unobstructed | a 410 p.p.m. K+, added as $KNO_3$.
b 390 p.p.m. K+, 270 p.p.m. Na+ added as 50–50 weight blend of $KNO_3$ and $NaNO_3$.

These data indicate the operability of the method of this invention and its effectiveness in permitting operation at low make-oil preheat temperatures which would otherwise result in salt deposition, and hence plugging, of the make-oil nozzle.

We claim:
1. In a process for producing carbon black by the pyrolytic decomposition of a hydrocarbon within a reactor the improve- comprising at least two normally solid inorganic compounds, at least one of said compounds being effective in reducing the structure of carbon black, said mixture having a melting point less than the melting points of said inorganic compounds, said mixture being introduced into said reactor in said hydrocarbon in a quantity sufficient to effect the structure of said carbon black, said hydrocarbon being at a temperature the melting point of said mixture.

2. The process of claim 1 in which said mixture comprises a carbon black structure-affecting alkali metal having an atomic number of at least 19.

3. The process of claim 2 in which said carbon black structure-affecting alkali metal is introduced in an amount within the range of from about 10 to about 1,000 parts by weight per million parts by weight of carbon black produced.

4. The process of claim 1 in which said mixture has a melting point less than 600° F.

5. The process of claim 1 in which said mixture comprises nitrogen oxide compounds of potassium and sodium.

6. The process of claim 5 in which said mixture comprises potassium nitrate and sodium nitrate in substantially equal quantities by weight and said hydrocarbon is introduced at a temperature of about 595° F.

7. The process of claim 1 in which said mixture comprises stannous chloride and potassium nitrate and has a melting point of less than 475° F.

8. The process of claim 1 in which said hydrocarbon is introduced into said reactor through a nozzle.

UNITED STATES PATENT OFFICE

CERTIFICATE OF CORRECTION

Patent No. 3,607,064                            Dated: September 21, 1971

Robert E. Dollinger et al

It is certified that error appears in the above-identified patent and that said Letters Patent are hereby corrected as shown below:

Column 1, after line 74 should be inserted --- the carbon black product can be employed with potassium ---.

Column 2, after line 74 should be inserted --- ment which comprises introducing into said reactor a mixture ---.

Signed and sealed this 7th day of March 1972.

(SEAL)
Attest:

EDWARD M. FLETCHER, JR.                 ROBERT GOTTSCHALK
Attesting Officer                           Commissioner of Patents